United States Patent
Spertus

(10) Patent No.: US 8,510,845 B1
(45) Date of Patent: Aug. 13, 2013

(54) METHOD AND APPARATUS FOR MONITORING IDENTITY MISREPRESENTATION BY A USER ON A NETWORK

(75) Inventor: Michael Spertus, Wilmette, IL (US)

(73) Assignee: Symantec Corporation, Mountain View, CA (US)

(*) Notice: Subject to any disclaimer, the term of this patent is extended or adjusted under 35 U.S.C. 154(b) by 977 days.

(21) Appl. No.: 11/731,320

(22) Filed: Mar. 30, 2007

(51) Int. Cl.
*G06F 7/04* (2006.01)

(52) U.S. Cl.
USPC ............ 726/26; 709/203; 709/224; 705/75

(58) Field of Classification Search
USPC ............ 726/26; 709/203, 224; 705/75
See application file for complete search history.

(56) References Cited

U.S. PATENT DOCUMENTS

| | | | |
|---|---|---|---|
| 7,086,085 B1* | 8/2006 | Brown et al. | 726/7 |
| 7,516,219 B2* | 4/2009 | Moghaddam et al. | 709/225 |
| 2002/0049806 A1* | 4/2002 | Gatz et al. | 709/203 |
| 2005/0228881 A1* | 10/2005 | Reasor et al. | 709/224 |
| 2006/0173792 A1* | 8/2006 | Glass | 705/75 |
| 2008/0005325 A1* | 1/2008 | Wynn et al. | 709/225 |
| 2008/0098292 A1* | 4/2008 | Embry | 715/226 |

\* cited by examiner

*Primary Examiner* — Ashok Patel
*Assistant Examiner* — Brian Shaw
(74) *Attorney, Agent, or Firm* — Wilmer Cutler Pickering Hale and Dorr LLP

(57) ABSTRACT

Method and apparatus for monitoring identity misrepresentation by a user on a network are described. In one example, validated identity information for the user is received from a trusted source. Data exchanged between a network client on a device associated with the user and the network is monitored. An identity misrepresentation by the user is detected based on the validated identity information. A notification of the identity misrepresentation is sent to the trusted source.

17 Claims, 5 Drawing Sheets

METHOD AND APPARATUS FOR MONITORING IDENTITY MISREPRESENTATION BY A USER ON A NETWORK

BACKGROUND OF THE INVENTION

1. Field of the Invention

The present invention relates generally to monitoring network transactions. More particularly, the present invention relates to a method and apparatus for monitoring identity misrepresentation by a user on a network.

2. Description of the Related Art

The internet and the World Wide Web ("web") have become available to a large amount of people of different age, background, and type. Since accessing the web has become common among children, parents have become concerned about their children's transactions with strangers. Parents have continuously tried to protect their children from external temptations and unsuitable transactions available over the Internet. For example, parents have been using key word filters, blockers, email monitors, and the like. In addition, website administrators have become strict in enforcing age requirements and digital identity checks to protect themselves, the parents, and the children.

As children become more Internet-savvy, they are finding ways to circumvent such protective measures. For example, the web has made it easy for children to alter their identity or create fictitious digital identities. Using the web, children are able to start accounts, contact individuals across the world, participate in transactions, chat, meet new people, and the like, all of which without parental supervision and, in many cases, without parental knowledge. Children circumvent any potential age restrictions simply by misrepresenting their age. Misrepresentation of age, for example, may lead to adults having relationships with minor children who are posing as older persons. Thus, identity misrepresentation over the web is a growing concern. Therefore, there is a need in the art for a method and apparatus that would allow for the monitoring of identity misrepresentation by a user on a network, such as the Internet.

SUMMARY OF THE INVENTION

Method and apparatus for monitoring identity misrepresentation by a user on a network are described. In one embodiment, validated identity information for the user is received from a trusted source. Data exchanged between a network client on a device associated with the user and the network is monitored. An identity misrepresentation by the user is detected based on the validated identity information. A notification of the identity misrepresentation is sent to the trusted source.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
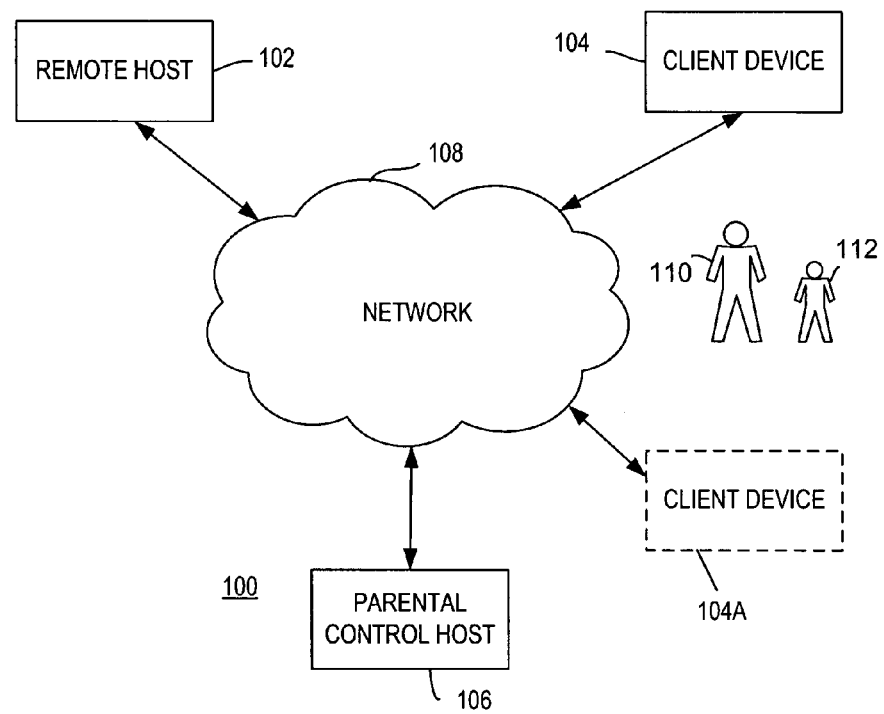
FIG. 1 is a block diagram depicting an exemplary embodiment of a networked computer system in accordance with one or more aspects of the invention.

FIG. 1 is a block diagram depicting an exemplary embodiment of a networked computer system 100 in accordance with one or more aspects of the invention. In one embodiment, the system 100 includes a client device 104 and a parental control host 106, each coupled to a network 108. The network 108 comprises a communication system that connects computer systems by wire, cable, fiber optic, and/or wireless links facilitated by various types of well-known network elements, such as hubs, switches, routers, and the like. The network 108 may employ various well-known protocols to communicate information. For example, the network 108 may be part of the Internet. The client device 104 may be any type of device capable of sending electronic data over the network 108, such as, personal computers (PCs), personal digital assistants (PDAs), wireless telephones, and the like. The parental control host 106 may comprise a computer capable of implementing a parental control service for a plurality of clients, as described below.

In the present example, the client device 104 includes a user 110 and a user 112. The user 112 is illustratively a minor child and the user 110 is illustratively a parent or guardian of the minor child 112 (the term "parent" as used herein is meant to encompass both a parent and a guardian). Although a parent/child relationship among the users is described as an example, in general it is assumed that the user 110 is a custodian that exhibits some form of custodial control over the user 112. For example, it is not necessary that the user 112 be a minor child, be an actual child of the user 110, or even be related to the user 110. Likewise, it is not necessary that the user 110 be a parent of the user 112 or be related to the user 112.

The client device 104 is configured to exchange data with remote hosts on the network 108, such as a remote host 102, using various types of network clients. Exemplary network clients include a browser client for exchanging web data, an e-mail client for exchanging electronic message data, an instant messaging (IM) client for exchanging instant messages, and the like. By way of example, various aspects of the invention are described with respect to the exchange of web data using a browser client. Those skilled in the art will appreciate that the aspects of the invention described below with respect to the specific embodiment of the exchange of web data may also be applied to other types of electronic data exchange, including those listed above.

The parent 110 is configured to register with the parental control host 106 to establish a monitoring service. Registration may comprise, for example, the establishment of an account accessible by a username/password or like type digital identity of the parent 110. The parent 110 also supplies identity information for the child 112, which may include various types of identity attributes. Exemplary identity attributes include the child's age, the child's gender, the child's (general) location of residence, or any other of a myriad of possible attributes. The parent 110 may choose to supply only those identity attributes that he or she desires to be monitored. Since this identity information for the child 112 is from a trusted source (i.e., the parent 110), the identity information is assumed to be valid ("validated identity information"). The parental control host 106 may verify that the validated identity information is originating from the parent 110 (e.g., by authenticating using the username/password or other digital identity as provided during registration).

The parent 110 further supplies contact information to the parental control host 106. The contact information allows the parental control host 106 to send notifications to the parent 110. The contact information may include an e-mail address, telephone number, residence address, or like type information. The contact information may be associated with a device other than the client device 104, such as a client device 104A. This may decrease the possibility of the child 112 intercepting notifications intended for the parent 110. As described in more detail below, the parental control host 106 is configured to cooperate with the client device 104 for monitoring data exchanged between a network client on the device 104 and a remote host. For example, web data exchanged between a browser client on the client device 104 and the network 108 may be monitored. The parental control host 106 detects any identity misrepresentation by the child 112 based on the validated identity information provided by the parent 110. The parental control host 106 sends a notification of any identity misrepresentations by the child 112 to the parent 110.

Figure 2:
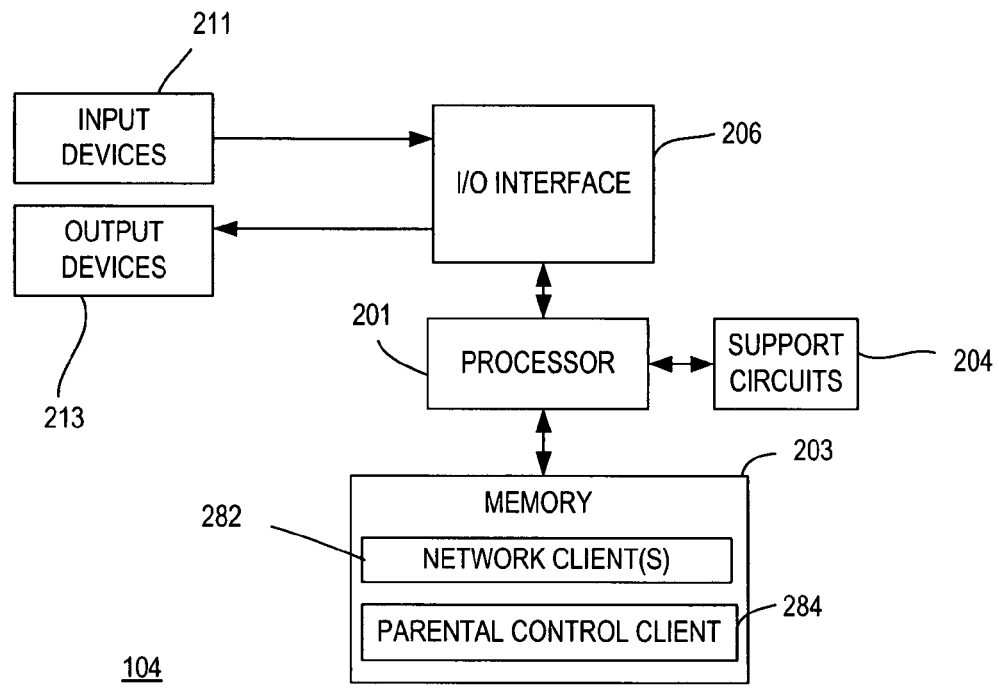
FIG. 2 is a block diagram depicting an exemplary embodiment of a client device computer in accordance with one or more aspects of the invention.

FIG. 2 is a block diagram depicting an exemplary embodiment of a computer 200 in accordance with one or more aspects of the invention. The computer may be used to implement the client device 104 and/or the client device 104A of FIG. 1. The computer 200 illustratively includes a processor 201, a memory 203, various support circuits 204 and an I/O interface 206. The processor 201 may include one or more microprocessors known in the art. The support circuits 204 for the processor 201 include conventional cache, power supplies, clock circuits, data registers, I/O interfaces, and the like. The I/O interface 206 may be directly coupled to the memory 203 or coupled through the processor 201. The I/O interface 206 may also be configured for communication with input devices 211 and/or output devices 213, such as a display, mouse, keyboard, and the like. The I/O interface 206 is also coupled to the network 108 for communication with remote hosts, including the parental control host 106.

The memory 203 stores processor-executable instructions and/or data that may be executed by and/or used by the processor 201. These processor-executable instructions may comprise hardware, firmware, software, and the like, or some combination thereof. Modules having processor-executable instructions that are stored in the memory 203 may include a one or more network clients 282 and a parental control client 284, which are discussed below. The computer 200 may be programmed with an operating system, which may include OS/2, Java Virtual Machine, Linux, Solaris, Unix, HPUX, AIX, Windows, among other known platforms. At least a portion of the operating system may be disposed in the memory 203. The memory 203 may include one or more of the following random access memory, read only memory, magneto-resistive read/write memory, optical read/write memory, cache memory, magnetic read/write memory, and the like, as well as signal-bearing media as described below.

Figure 3:
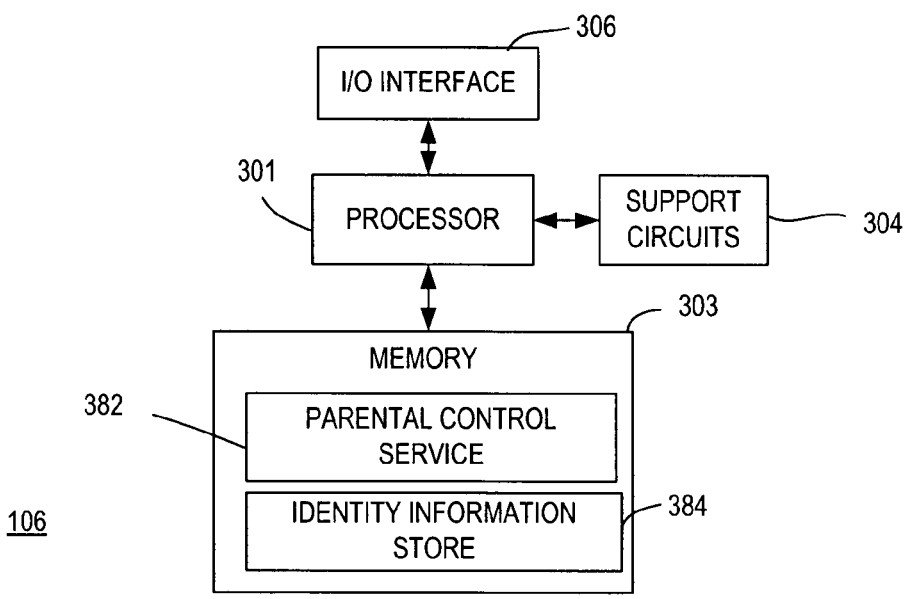
FIG. 3 is a block diagram depicting an exemplary embodiment of a parent control host computer in accordance with one or more aspects of the invention.

FIG. 3 is a block diagram depicting an exemplary embodiment of a computer 300 suitable for use as the parental control host 106 in accordance with one or more aspects of the invention. The computer 300 illustratively includes a processor 301, a memory 303, various support circuits 304, and an I/O interface 306. The processor 301 may include one or more microprocessors known in the art. The support circuits 304 for the processor 301 include conventional cache, power supplies, clock circuits, data registers, I/O interfaces, and the like. The I/O interface 306 may be directly coupled to the memory 303 or coupled through the processor 301. The I/O interface 306 is coupled to the network 108 for communication with clients, such as the client device 104 and the client device 104A.

The memory 303 stores processor-executable instructions and/or data that may be executed by and/or used by the processor 301. These processor-executable instructions may comprise hardware, firmware, software, and the like, or some combination thereof. Modules having processor-executable instructions that are stored in the memory 303 may include a parental control service 382. Data stored in the memory 303 may include an identity information store 384. The computer 300 may be programmed with an operating system, which may include OS/2, Java Virtual Machine, Linux, Solaris, Unix, HPUX, AIX, Windows, among other known platforms. At least a portion of the operating system may be disposed in the memory 303. The memory 303 may include one or more of the following random access memory, read only memory, magneto-resistive read/write memory, optical read/write memory, cache memory, magnetic read/write memory, and the like, as well as signal-bearing media as described below.

With reference to FIGS. 1-3, the parental control client 284 is configured to monitor data exchanged between the network client(s) 282 and the network 108. In one embodiment, the network client(s) 282 include(s) a browser client and the parental control client 284 monitors the exchange of web data. Web data may have various formats, including data formatted in accordance with hypertext transfer protocol (HTTP) and/or related protocols. In one embodiment, the parental control client 284 is configured to process all incoming and outgoing network traffic to and from the network client(s) 282, such as HTTP traffic or the like to and from a browser client. The parental control client 284 analyzes incoming network traffic to identify constructs configured to elicit identity information from the child 112. An exemplary construct that elicits identity information is a web form as created using hypertext markup language (HTML), extensible markup language (XML), Javascript, Java, or the like. The web form may include fields configured to elicit particular identity information, such as name, age, social security number, etc. Web forms are typically used to establish accounts at various websites, such as social networking sites (e.g., MYSPACE, FRIENDSTER, etc.), message boards, and the like. Many of these account-driven web sites require users to enter their age or otherwise indicate there age as being over a predefined age (e.g., click a button stating "I am over 18").

The parental control client 284 analyzes outgoing traffic from the network client(s) 282 to capture identity information submitted in response to the identity-eliciting constructs. In one embodiment, the parental control client 284 employs a filter and/or network client "plug-in" to detect the identity-eliciting constructs. For example, the parental control client 284 may employ an HTTP filter and/or a browser helper object.

The captured identity information is associated with the child 112. Since this identity information is assumed to be submitted by the child 112, the identity information is purported to be valid ("purported identity information"). The parental control client 284 then provides the purported identity information to the parental control host 106, which is received by the parental control service 382. The identity information store 384 includes validated identity information for children of parent subscribers. The parental control service 382 compares the purported identity information with the validated identity information for the child 112 to determine if an identity misrepresentation has occurred. If an identity misrepresentation has occurred, the parental control service 382 generates a notification of the identity misrepresentation. The notification may be sent to the parent 110 using the contact information the parent 110 submitted during registration. Alternatively, the notification may be logged for viewing by the parent 110 when the parent 110 logs into the parental control host 106.

Aspects of the invention may be understood with reference to the following exemplary scenario. Assume the parent 110 registers with the parental control host 106 and submits a validated age of the child 112 along with an e-mail address of the parent 110. The parental control client 284 is then configured to monitor network traffic to and from the network client(s) 282 to detect constructs configured to elicit an age. This configuration of the parental control client 284 may be performed by the parental control service 382 or by the parent 110. Assume that the parental control client 284 is configured to monitor HTTP traffic to and from a browser client. The parental control client 284 analyzes the HTTP traffic to detect constructs eliciting an age. Such constructs may be identified within hypertext markup language (HTML) data or the like using an HTTP filter. Alternatively, a browser helper object may be used to cause the browser client to re-direct the age request/response through the parental control client 284. In any case, the parental control client 284 obtains a purported age (e.g., an indication that the user is over 18) and sends the purported age to the parental control service 382. The parental control service 382 compares the purported age with the validated age of the child 112 and generates a notification if an age misrepresentation is detected. The notification can then be sent to the e-mail address of the parent 110. This notifies the parent 110 that the child 112 may have misrepresented his or her age, allowing the parent 110 to take the appropriate action.

Those skilled in the art will appreciate that the functions performed by the parental control client 284 and the functions performed by the parental control service 382 may be performed by the same computer. For example, the functions performed by the parental control client 284 may be performed by the parental control host 106. That is, the parental control host 106 may be configured to monitor data exchanged by the network client(s) 282. This may be achieved, for example, by configuring the network client(s) 282 to use the parental control host 106 has a proxy such that network traffic to and from the client(s) 282 is routed through the parental control host 106.

Figure 4:
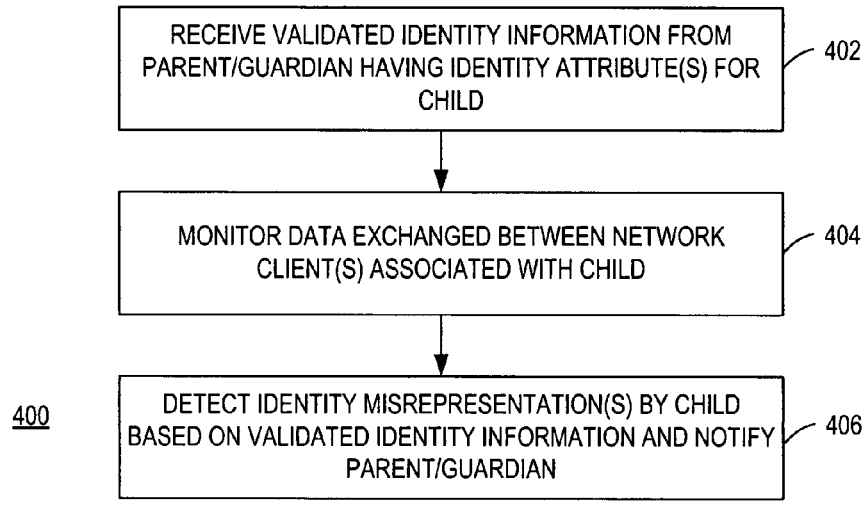
FIG. 4 is a flow diagram depicting an exemplary embodiment of a method for monitoring online identity information in accordance with one or more aspects of the invention.

FIG. 4 is a flow diagram depicting an exemplary embodiment of a method 400 for detecting identity misrepresentation by a child or other user in accordance with one or more aspects of the invention. The method 400 starts at step 402, where validated identity information for the child is received from parent/guardian (or other custodian). The validated identity information includes one or more identity attributes (e.g., age). At step 404, data exchanged between at least one network client associated with the child is monitored. At step 406, at least one identity misrepresentation by the child is detected based on the validated identity information and the parent/guardian is notified.

Figure 5:
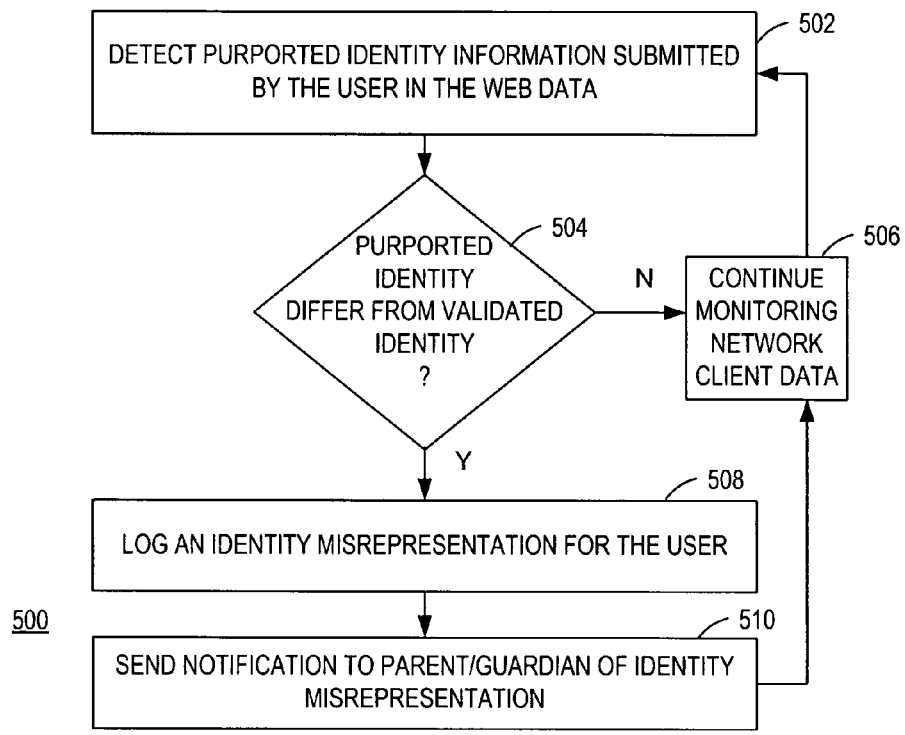
FIG. 5 is a flow diagram depicting an exemplary embodiment of a method for monitoring web data in accordance with one or more aspects of the invention.

FIG. 5 is a flow diagram depicting an exemplary embodiment of a method 500 for detecting identity misrepresentation by a child or other user in accordance with one or more aspects of the invention. The method 500 may be performed at step 406 of the method 400. At step 502, purported identity information submitted by the network client(s) in the monitored data is detected. At step 504, a determination is made whether the purported identity information differs from the validated identity of the child. If not, the method proceeds to step 506, where monitoring of the data exchanged by the network clients is continues. If the purported identity information does differ from the validated identity information at step 504, the method 500 proceeds to step 508. At step 508, an identity misrepresentation for the child is logged. Logging of the identity misrepresentation includes generation of a notification of the identity misrepresentation. At step 510, the parent/guardian is notified of the identity misrepresentation. From step 510, the method 500 proceeds to step 506 and repeats.

Returning to FIGS. 1-3, in some cases, the child 112 may misrepresent their identity using another device that does not monitor or have the parental control client 284. For example, the child 112 may create an account at a social networking web site and misrepresent his or her age. When the child 112 returns to using the device 104, the exchanged data will likely not including any identity eliciting constructs, since an account was already created. Thus, in some embodiments, the parental control client 284 is configured to analyze the data exchanged with the network client(s) 282 in order to detect an account login. From the account login, the parental control client 284 may obtain purported identity information. The purported identity information may be inferred from the account login. For example, the parental control client 284 may detect a login to a web site that is restricted to users over a specific age. The purported identity information may also be directly obtained from the exchanged data. For example, the parental control client 284 an obtain identity attribute(s) when the child 112 browses to an account information page. The parent control client 284 is configured to send the purported identity information to the parental control service 382, which operates as described above.

Figure 6:
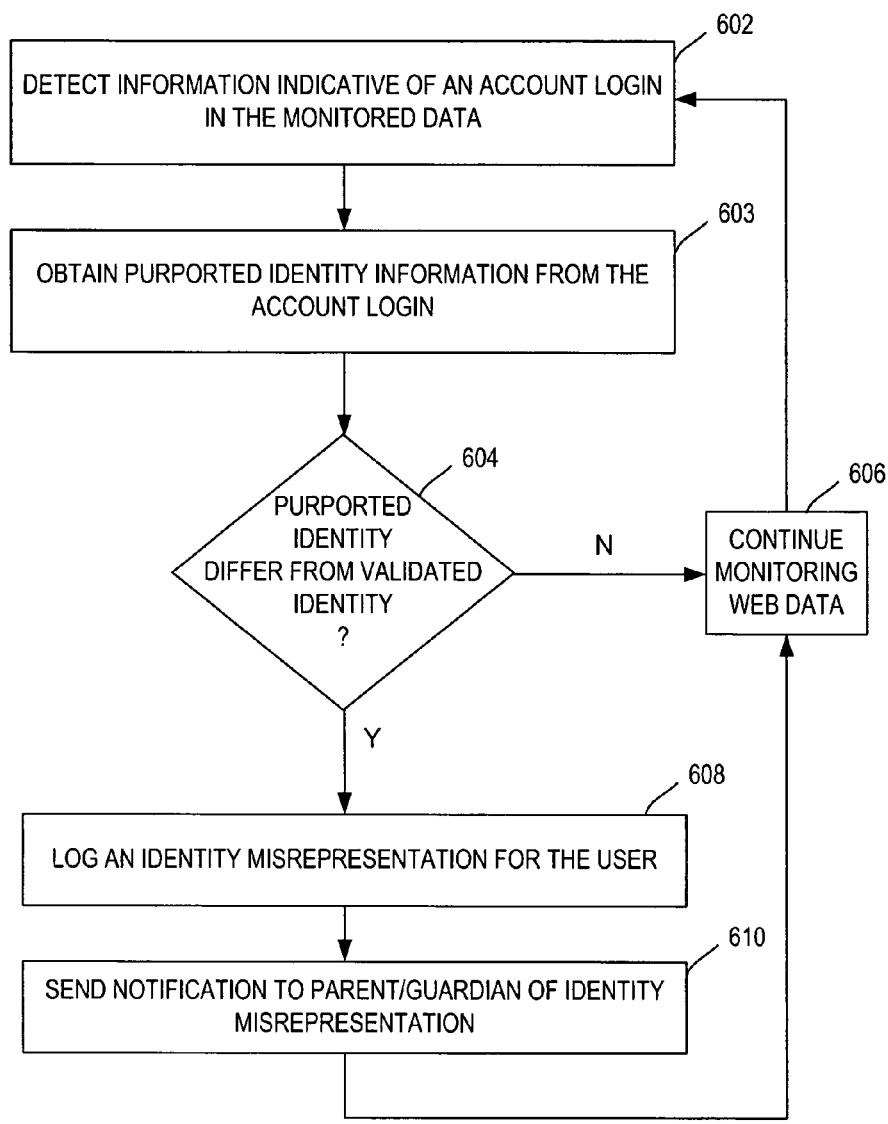
FIG. 6 is a flow diagram depicting an exemplary embodiment of a method for monitoring web site access in accordance with one or more aspects of the invention.

FIG. 6 is a flow diagram depicting an exemplary embodiment of a method 600 for detecting identity misrepresentation by a child or other user in accordance with one or more aspects of the invention. The method 600 may be performed at step 406 of the method 400. At step 602, information indicative of an account login is detected within the monitored data. At step 603, purported identity information is obtained from the account login. At step 604, a determination is made whether the purported identity information differs from the validated identity of the child. If not, the method proceeds to step 606, where monitoring of the data exchanged by the network clients is continues. If the purported identity information does differ from the validated identity information at step 604, the method 600 proceeds to step 608. At step 608, an identity misrepresentation for the child is logged. Logging of the identity misrepresentation includes generation of a notification of the identity misrepresentation. At step 610, the parent/guardian is notified of the identity misrepresentation. From step 610, the method 600 proceeds to step 606 and repeats.

Returning to FIGS. 1-3, in some embodiments, the parental control client 284 is configured to detect acquisition or use by the child 112 of a digital identity having at least one identity claim. A "digital identity" encompasses some form of security token having one or more identity attributes, referred to as "claims." For example, a digital identity may include a name, age, gender, and the like of a user. In some cases, the digital identity is backed by a public key infrastructure (PKI), which allows a relying party to authenticate a digital identity submitted by a user. Some digital identities may be created by the user (self-asserted identities), while others may be created by a third-party, referred to as an identity provider. An exemplary digital identity is an INFOCARD managed by the MICROSOFT CARDSPACE system. The parental control client 284 obtains purported identity information from acquisition and/or use of a digital identity by the child 112. The parent control client 284 is configured to send the purported identity information to the parental control service 382, which operates as described above.

Figure 7:
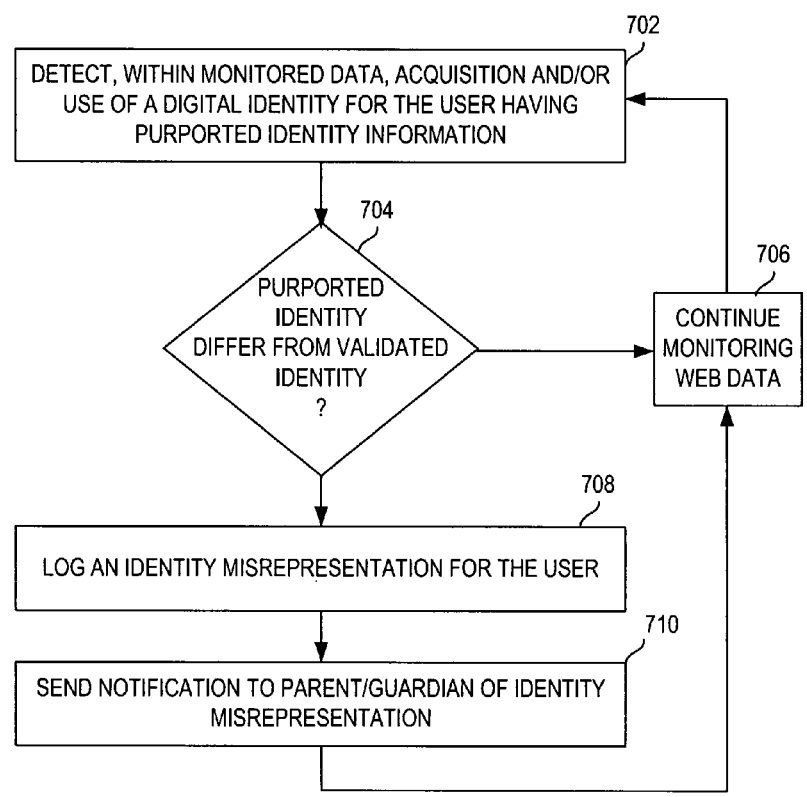
FIG. 7 is a flow diagram depicting an exemplary embodiment of a method for monitoring purported identity information monitoring in accordance with the present invention.

FIG. 7 is a flow diagram depicting an exemplary embodiment of a method 700 for detecting identity misrepresentation by a child or other user in accordance with one or more aspects of the invention. The method 700 may be performed at step 406 of the method 400. At step 702, acquisition and/or use of a digital identity for the child is detected. The digital identity includes purported identity information for the child. At step 704, a determination is made whether the purported identity information differs from the validated identity of the child. If not, the method proceeds to step 706, where monitoring of the data exchanged by the network clients is continues. If the purported identity information does differ from the validated identity information at step 704, the method 700 proceeds to step 708. At step 708, an identity misrepresentation for the child is logged. Logging of the identity misrepresentation includes generation of a notification of the identity misrepresentation. At step 710, the parent/guardian is notified of the identity misrepresentation. From step 710, the method 700 proceeds to step 706 and repeats.

In some embodiments, the invention is an apparatus for detecting identity misrepresentation of a user on a network. The apparatus comprises means for receiving validated identity information for the user from a trusted source, means for monitoring data exchanged between a network client on a device associated with the user and the network, means for detecting an identity misrepresentation by the user based on the validated identity information, and means for sending a notification of the identity misrepresentation to the trusted source.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method of detecting identity misrepresentation of at least one user on a network, comprising:
    receiving registration information from a trusted source to establish a monitoring account associated with a monitoring service for detecting identity misrepresentation of at least one user seeking to create a new account, wherein the at least one user is not the trusted source;
    responsive to receiving the registration information from the trusted source, receiving validated identity information from the trusted source, wherein the validated identity information is associated with the at least one user, wherein the validated identity information includes at least one identity attribute of the at least one user according to the trusted source;
    responsive to receiving the validated identity information from the trusted source, monitoring data exchanged between a network client via a filter object on a device associated with the at least one user and the network, wherein the filter object is configured to direct the monitored data exchanged to a monitoring control client associated with the monitoring service, and wherein the monitored data comprises identity-related data comprising data associated with web forms configured to elicit identity information from the at least one user seeking to create the new account;
    detecting an identity misrepresentation by the at least one user on the device using the monitoring control client executing on the device, based on comparing the validated identity information from the trusted source with identity-related data directed from the filter object associated with the at least one user seeking to create the new account, wherein detecting the identity misrepresentation comprises:
        detecting, within the monitored data, information indicative of an account login;
        obtaining purported identity information in response to the account login; and
        logging the identity misrepresentation for the at least one user if the purported identity information differs from the validated identity information; and
    sending a notification of the identity misrepresentation to the trusted source based on the detected identity misrepresentation.

2. The method of claim 1, wherein:
    receiving validated identity information comprises verifying the validated identity information as originating from a trusted source; and
    receiving registration information comprises receiving contact information for the trusted source.

3. The method of claim 2, wherein the notification is sent to the trusted source based on the contact information.

4. The method of claim 1, wherein the step of detecting the identity misrepresentation comprises:
    detecting purported identity information submitted by the at least one user in the data; and
    logging the identity misrepresentation for the at least one user if the purported identity information differs from the validated identity information.

5. The method of claim 1, wherein the validated identity information includes at least one identity attribute of the at least one user according to the trusted source, and wherein the method further comprises:
    detecting, within the data, at least one of acquisition or use of a digital identity for the at least one user having at least one identity claim; and
    logging the identity misrepresentation for the at least one user if the at least one identity attribute of the at least one user as set forth in the validated identity information differs from the at least one identity claim in the digital identity.

6. The method of claim 1, wherein the step of monitoring comprises:
    processing hypertext transfer protocol (HTTP) network traffic at the device using the filter-object to obtain the data, wherein the filter object comprises at least one of an HTTP filter and a browser helper object.

7. The method of claim 6, wherein the step of detecting the identity misrepresentation further comprises:

detecting, within the data, at least one construct configured to elicit identity information using the filter object.

8. The method of claim 1, wherein the validated identity information includes at least one of an age of the at least one user, a gender of the at least one user, and location information for the at least one user.

9. The method of claim 1, wherein the at least one user comprises a minor child and wherein the trusted source comprises a parent or guardian of the minor child.

10. Apparatus for detecting identity misrepresentation of at least one user on a network, comprising:
   means for receiving registration information from a trusted source to establish a monitoring account associated with a monitoring service for detecting identity misrepresentation of at least one user seeking to create a new account, wherein the at least one user is not the trusted source;
   means for receiving validated identity information from the trusted source, wherein the validated identity information is associated with the at least one user, wherein the validated identity information includes at least one identity attribute of the at least one user according to the trusted source;
   means for monitoring data exchanged between a network client via a filter object on a device associated with the at least one user and the network, wherein the filter object is configured to direct the monitored data exchanged to a monitoring control client associated with the monitoring service, and wherein the monitored data comprises identity-related data comprising data associated with web forms configured to elicit identity information from the at least one user seeking to create the new account;
   means for detecting an identity misrepresentation by the at least one user on the device using the monitoring control client executing on the device, based on comparing the validated identity information from the trusted source with identity-related data directed from the filter object associated with the at least one user seeking to create the new account, wherein the means for detecting the identity misrepresentation comprises:
      means for detecting, within the monitored data, information indicative of an account login;
      means for obtaining purported identity information in response to the account login; and
      means for logging the identity misrepresentation for the at least one user if the purported identity information differs from the validated identity information; and
   means for sending a notification of the identity misrepresentation to the trusted source based on the detected identity misrepresentation.

11. The apparatus of claim 10, further comprising:
   means for receiving contact information for the trusted source; and
   wherein the means for sending the notification is responsive to the contact information.

12. The apparatus of claim 10, wherein the means for detecting the identity misrepresentation comprises:
   means for detecting purported identity information submitted by the at least one user in the data; and
   means for logging the identity misrepresentation for the at least one user if the purported identity information differs from the validated identity information.

13. The apparatus of claim 10, wherein the validated identity information includes at least one identity attribute of the at least one user according to the trusted source, and wherein the method further comprises:
   means for detecting, within the data, at least one of acquisition or use of a digital identity for the at least one user having at least one identity claim; and
   means for logging the identity misrepresentation for the at least one user if the at least one identity attribute of the at least one user as set forth in the validated identity information differs from the at least one identity claim in the digital identity.

14. A system for detecting identity misrepresentation of at least one user on a network, comprising:
   a client for monitoring data exchanged between a network client on a device via a filter object associated with at least one user and the network and obtaining purported identity information by the at least one user, wherein the filter object is configured to identify the purported identity information for use by a parental control client, and wherein the monitored data comprises at least data associated with web forms configured to elicit identity information from the at least one user seeking to create the new account; and
   a service for receiving registration information from a trusted source to establish a monitoring account for detecting identity misrepresentation of the at least one user seeking to create a new account, receiving validated identity information for the user from the trusted source, obtaining the purported identity information from the client, detecting an identity misrepresentation by the user on the device using the parental control client executing on the device, based on comparing the validated identity information based on a comparison between the validated identity information from the trusted source with the purported identity information from the filter object associated with the at least one user seeking to create the new account, and sending a notification of the identity misrepresentation to the trusted source;
   wherein the at least one user is not the trusted source;
   wherein the validated identity information includes at least one identity attribute of the at least one user according to the trusted source; and
   wherein the client is configured to:
      detect, within the monitored data, information indicative of an account login; and
      obtain the purported identity information in response to the account login.

15. The system of claim 14, wherein the service is configured to:
   receive contact information for the trusted source; and
   send the notification based on the contact information.

16. The system of claim 14, wherein the validated identity information includes at least one identity attribute of the at least one user according to the trusted source, and wherein the client is further configured to:
   detect, within the data, at least one of acquisition or use of a digital identity for the user having at least one identity claim.

17. The system of claim 14, wherein the client is configured to:
   process hypertext transfer protocol (HTTP) network traffic at the device using the filter object to obtain the data, wherein the filter object comprises at least one of an HTTP filter and a browser helper object.

* * * * *